Figure 4:
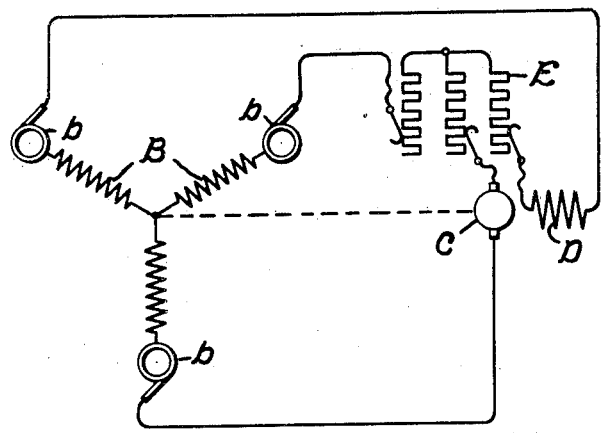

E. F. W. ALEXANDERSON.
ALTERNATING CURRENT MOTOR.
APPLICATION FILED OCT. 19, 1911.
1,019,402.
Patented Mar. 5, 1912.
2 SHEETS—SHEET 1.
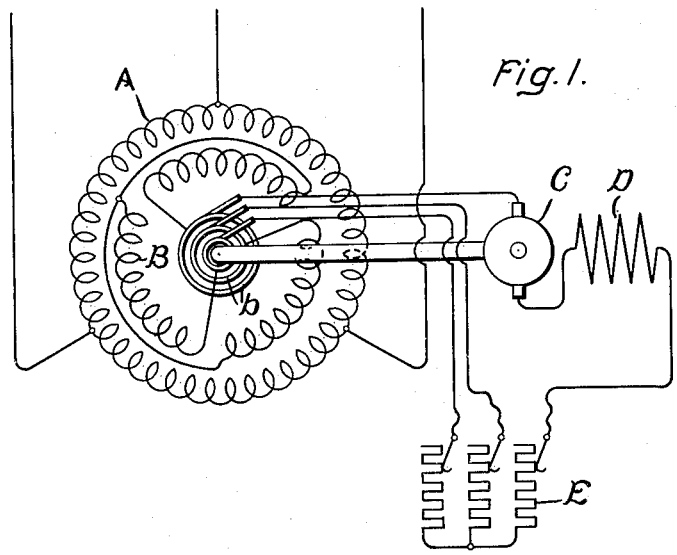
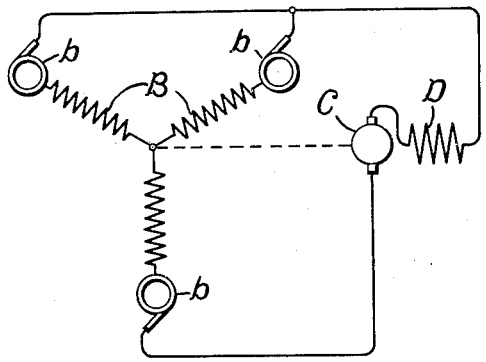
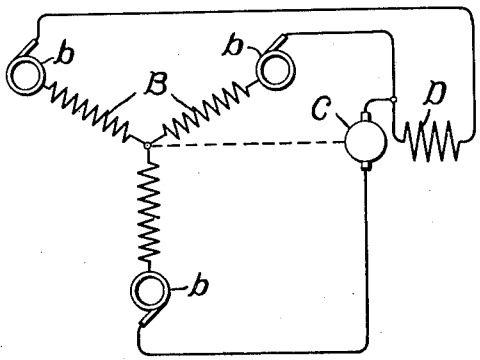
Witnesses:
Earl G. Klock
J. Ellis Glen
Inventor:
Ernst F. W. Alexanderson,
by Albert G. Davis
His Attorney.

E. F. W. ALEXANDERSON.
ALTERNATING CURRENT MOTOR.
APPLICATION FILED OCT. 19, 1911.

1,019,402.

Patented Mar. 5, 1912.

2 SHEETS—SHEET 2.

Witnesses:
Earl G. Klock.
J. Ellis Glen

Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

1,019,402.   Specification of Letters Patent.   Patented Mar. 5, 1912.

Application filed October 19, 1911. Serial No. 655,476.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Motors, of which the following is a specification.

My invention relates to alternating current motors of the type which are adapted to be brought up to speed as induction motors and operated as synchronous motors when up to speed, and the object of my invention is to increase the stability of synchronous operation.

It has been proposed heretofore to operate motors of the induction type, that is, with distributed windings on both members, by starting them in the usual manner with resistances in the secondary circuit and connecting a direct current exciter to the secondary when the motor is up to speed so as to cause the motor to operate synchronously. When such a motor is overloaded so as to drop out of synchronism, it will still continue to run as an induction motor, but while the motor is so running considerably increased currents are drawn from the line and the motor pulsates on account of the direct current poles of the secondary slipping by the alternating current poles of the primary.

By my invention I increase the stability against dropping out of step and at the same time decrease the excess current and pulsations when the motor is out of step by employing instead of the ordinary shunt wound exciter a quick acting, series wound exciter. By giving the exciter a series field and otherwise designing it for quick action as by laminating its field magnet, the exciter may be made to respond quickly, so as to take up the increased current induced in the secondary winding momentarily by the dropping back caused by a sudden increase of load, so that the stability of synchronous operation is thereby increased; and also, if the machine is pulled out of synchronism, the series-wound exciter can respond to the alternating current induced in the secondary and can reverse its polarity whenever the secondary poles slip by the poles in the primary, thereby decreasing the pulsations of current in the primary winding and increasing the tendency to fall into synchronous operation again as soon as the overload disappears. A series wound exciter has the further advantage that it may be left permanently in circuit with the motor secondary both in starting and running because at starting it will not build up its excitation until the resistance in the secondary circuit has been reduced to a small amount, that is, until the motor is nearly up to speed. This is particularly true if the exciter is driven by the motor, and therefore reaches full speed with the motor. Therefore, the exciter produces no effect in the secondary circuit of the motor until the motor is up to speed and the secondary resistance cut out, so that it may be left permanently in circuit and the switching apparatus consequently simplified.

A further feature of my invention consists in so connecting the exciter armature and series field that the maximum effect is obtained from the currents momentarily induced in the secondary of the motor by its falling back upon an overload. The voltage induced by this falling back has its maximum value in the portion of the winding displaced 90 electrical degrees from the line of direct current magnetization. This fact is taken advantage of in the ordinary synchronous motor by placing the damping windings between the poles, that is, 90 electrical degrees from the line of direct current magnetization. I take advantage of this fact by connecting the armature and series field winding of the exciter to phases of the motor secondary differing in phase by approximately 90°. The strengthening of the current delivered by the exciter obtainable in this way is only momentary, and in order to take care of continued overloads of such an amount that the motor, in order to carry them synchronously, would require more direct current than the exciter could deliver continuously, I provide means responsive to an increase in the primary current of the motor for automatically increasing the exciting current delivered by the exciter during such overloads.

My invention will best be understood by reference to the accompanying drawings in which—

Figure 5:
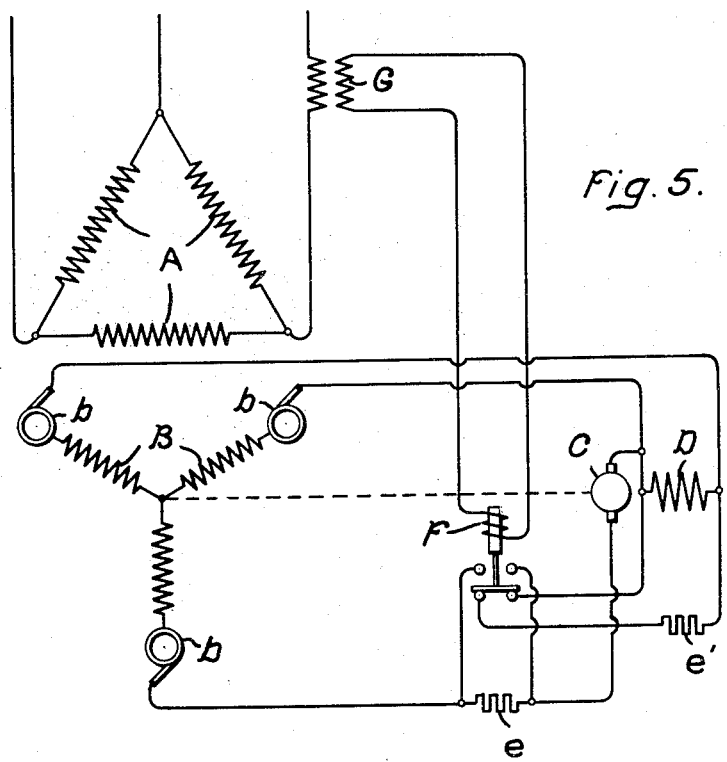

Figure 1 shows diagrammatically an induction motor arranged in accordance with my invention; Fig. 2 shows in a simplified diagram the secondary circuit of the motor for synchronous operation in accordance with the arrangement of Fig. 1; Fig. 3 shows a modified arrangement of connections for giving still greater stability for synchronous operation; Fig. 4 shows the starting connections corresponding to the arrangement of Fig. 3; and Fig. 5 shows a further modification.

In the drawings, A and B represent respectively the primary and secondary windings of an alternating current motor. Both windings are shown diagrammatically as three phase distributed windings. The terminals of the Y connected secondary winding B are connected to collector rings $b$.

C represents the armature and D the series field winding of an exciter mechanically driven by the motor. This exciter, for the reasons heretofore pointed out, is designed to be as quick acting as possible, and for this reason preferably should have a laminated field magnet.

E represents a starting resistance in series with the exciter and the motor secondary. The exciter is left permanently in circuit at starting and has no effect until the resistance E is cut out, and the motor is up to speed for it is only then that the series exciter can build up its magnetization. The running connections corresponding to the arrangement of Fig. 1 are shown in Fig. 2. Because of its quick acting series characteristic the exciter gives increased stability at synchronism and decreased pulsations when the motor is pulled out of synchronism as has been heretofore explained. In order further to increase the stability on synchronous operation, the arrangement of Fig. 3 may be employed. In this the right hand phase of the secondary winding is in shunt to the left hand phase and the exciter field winding D which are in series, and the exciter armature C is in series with this parallel circuit and with the third phase of the secondary winding. Thus the armature and field of the exciter are still in series, although a part of the armature current is shunted around the field winding through one phase of the motor secondary; but with respect to voltages induced in the motor secondary by the primary winding, the exciter armature and field are connected to secondary phases differing in phase by 90 electrical degrees. In other words, while the axis of the direct current magnetization is the axis of the lower secondary phase to which the lower armature brush of the exciter is directly connected, the terminals of the exciter field winding are connected to points on the secondary winding on the motor on a line at right angles to the axis of direct current magnetization. Consequently the momentary voltage induced in the secondary winding of the motor upon the momentary dropping back in phase due to a sudden overload, which voltage is a maximum on the line at right angles to the axis of direct current magnetization, produces the maximum effect on the field of the exciter so as to greatly increase momentarily the current delivered by the exciter, and thereby to enable the motor to carry the excess load.

Suitable starting connections corresponding to the running connections of Fig. 3 are shown in Fig. 4 which needs no further explanation.

In order to take care of prolonged overloads which require a greater excitation than the exciter could continuously deliver, the arrangement of Fig. 5 may be employed. The connections of this figure are the same as those of Fig. 3 except that additional means are provided for increasing the exciting current during overloads. For this purpose a magnetically actuated switch F is provided, the winding of which is supplied from a series transformer G in the primary circuit of the motor, so that the magnet F is energized by a current corresponding in amount to the primary current of the motor. Upon an overload on the motor the magnet winding F operates automatically to increase the exciting current delivered by the exciter. This result may be accomplished by arranging the contacts controlled by the magnet winding to cut out a small resistance in series with the exciter armature or to open the circuit of a resistance connected in shunt to the field winding of the exciter, or both. Thus in Fig. 5 I have shown a resistance $e$ normally in series with the armature C, and a resistance $e'$ normally in shunt to the field winding D. When magnet winding F is energized with a current corresponding to an overload on the motor the contacts which it controls short circuit the resistance $e$ and break the circuit of resistance $e'$, thus as long as the overload continues the exciting current delivered by the exciter is increased above its normal value.

I do not desire to limit myself to the particular connections and arrangement of parts shown and described but aim in the appended claims to cover all modifications which are within the scope of my invention.

What I claim as new and desire to secure by Letters Patent of the United States, is,

1. In combination, an alternating current motor having distributed windings on both primary and secondary members, and a quick-acting series-wound direct-current exciter electrically connected to the secondary of the motor.

2. In combination, an alternating current motor having distributed windings on both primary and secondary members, and a quick-acting series-wound direct-current exciter permanently connected electrically to the secondary of the motor and mechanically driven by said motor.

3. In combination, an alternating current motor having distributed windings on both primary and secondary members, a quick-acting series-wound direct-current exciter permanently connected electrically to the secondary of the motor and mechanically driven by said motor, and a variable resistance in series with said exciter and motor secondary for starting the motor.

4. In combination, an alternating current motor having distributed windings on both primary and secondary members, the secondary winding being polyphase, and a quick-acting series-wound direct-current exciter electrically connected to the secondary of the motor, the armature and field winding of the exciter being connected to phases of said secondary differing in phase by approximately 90 degrees.

5. In combination, an alternating current motor having distributed windings on both primary and secondary members, the secondary winding being polyphase, and quick-acting series-wound direct-current exciter mechanically driven by said motor and permanently connected electrically to the secondary of the motor, the armature and field winding of the exciter being connected to phases of said secondary differing in phase by approximately 90 degrees.

6. In combination, an alternating current motor having distributed windings on both primary and secondary members, the secondary winding being polyphase, a quick-acting series-wound direct-current exciter mechanically driven by said motor and permanently connected electrically to the secondary of the motor, the armature and field winding of the exciter being connected to phases of said secondary differing in phase by approximately 90 degrees, and a variable resistance in series with said exciter and the motor secondary for starting the motor.

7. In combination, an alternating current motor having distributed windings on both primary and secondary members, a quick-acting series-wound direct-current exciter electrically connected to the secondary of the motor, and means automatically operative upon an overload on the motor for increasing the exciting current delivered by said exciter.

8. In combination, an alternating current motor having distributed windings on both primary and secondary members, a quick-acting series-wound direct-current exciter electrically connected to the secondary of the motor, a magnet winding energized by a current proportional to the primary current of the motor, and contacts controlled by said magnet winding controlling the exciting current delivered by said exciter.

9. In combination, an alternating current motor having distributed windings on both primary and secondary members, the secondary winding being polyphase, a quick-acting series-wound direct-current exciter electrically connected to the secondary of the motor, the armature and field winding of the exciter being connected to phases of said secondary differing in phase by approximately 90 degrees and means operative upon an overload on the motor for automatically increasing the exciting current delivered by said exciter.

10. In combination, an alternating current motor having distributed windings on both primary and secondary members, the secondary winding being polyphase, a quick-acting series-wound direct-current exciter electrically connected to the secondary of the motor, the armature and field winding of the exciter being connected to phases of said secondary differing in phase by approximately 90 degrees, a magnet winding energized by a current proportional to the primary current of the motor, and contacts controlled by said magnet winding controlling the exciting current delivered by said exciter.

In witness whereof, I have hereunto set my hand this 17th day of October, 1911.

ERNST F. W. ALEXANDERSON.

Witnesses:
    BENJAMIN B. HULL,
    HELEN ORFORD.